United States Patent [19]

Ishikawa et al.

[11] 4,094,951

[45] June 13, 1978

[54] COMPOSITES OF OXIDIZED GRAPHITE MATERIAL AND EXPANDED GRAPHITE MATERIAL

[75] Inventors: Toshikatsu Ishikawa, Tokyo; Toyonosuke Kanemaru, Zushi; Haruo Teranishi, Machida; Kazumasa Onishi, Yokohama, all of Japan

[73] Assignee: Nippon Carbon Co., Ltd., Tokyo, Japan

[21] Appl. No.: 668,112

[22] Filed: Mar. 18, 1976

[51] Int. Cl.² .............................................. B29C 3/00
[52] U.S. Cl. ...................................... 264/325; 106/56; 106/286; 264/122; 264/120
[58] Field of Search ..................... 106/38.27, 39.9, 56, 106/286; 423/448; 264/105, 29, 325; 204/294

[56] References Cited

U.S. PATENT DOCUMENTS

| | | | |
|---|---|---|---|
| 1,175,958 | 3/1916 | Karplus | 423/448 |
| 3,492,197 | 1/1970 | Olstowski et al. | 264/29.1 |

OTHER PUBLICATIONS

Chem. Abs., vol. 56, 1168b.

*Primary Examiner*—Lorenzo B. Hayes
*Attorney, Agent, or Firm*—Frank J. Jordan

[57] ABSTRACT

A process for producing a composite graphite material in a molded form having high density and tensile strength as well as impermeability, comprising the steps of mixing expanded graphite material with oxidized graphite material as the binder and compression molding the resulting mixture. In one embodiment, this invention relates to the composite graphite material produced by said process.

5 Claims, No Drawings

COMPOSITES OF OXIDIZED GRAPHITE MATERIAL AND EXPANDED GRAPHITE MATERIAL

This invention relates to a process for producing a composite graphite material and more particularly it relates to a process for producing a composite graphite material in a molded form having high density and tensile strength as well as impermeability to gases which comprises the steps of mixing expanded graphite material with oxidized graphite material as the binder and compression molding the resulting mixture.

There has heretofore been disclosed a molded graphite material manufactured by incorporating an expanded graphite material with a synthetic resin, as a binder, such as cellulose acetate or phenol resin and then compression molding the whole mass; however, such molded graphite material will raise problems as to heat resistance, chemical resistance, moldability during the period of manufacture, and the like.

An object of this invention is to provide a process for producing flexible graphite products which are impermeable to gases and freed of said various problems or disadvantages and have a low gasket coefficient, high density and excellent mechanical strength, the flexible graphite products being such that they are moldable under a low pressure.

The expanded graphite material is incorporated with oxidized graphite material (or graphite oxide) as the additive and then compression molded to form a new molded graphite material having the following various advantages.

The new molded graphite material has a higher density than a conventional molded one obtained by compression molding only the same expanded graphite material under the same pressure as used in the production of said new molded one; in other words, the new molded one made of the expanded graphite material and the additive is not only obtainable at a lower molding pressure and but also more excellent in compression strength than the conventional one made of the same expanded graphite material only.

In addition, the expanded graphite material molding obtained by compression molding tends to cause cracking and peeling. The addition of the oxidized graphite material to the expanded one prior to molding thereof is effective and necessary not only to eliminate said tendency or drawback and but also obtain low permeability to gases on the resulting product. Oxidized graphite material is small in particle size as compared with expanded one; the oxidized graphite material which may be used in this invention is a colloidal one obtained by oxidizing a starting graphite material having, for example, a 200-mesh or finer particle size, while the expanded one used herein is one which is obtained by expanding a starting graphite material having, for example, a 40-mesh or coarser particle size to an extent that the resulting expanded one has a volume 20 – 70 times that of the starting one. The addition of the oxidized graphite material to the expanded one will result in producing the desired graphite material molding which is dense, substantially impermeable to gases and low in gasket coefficient.

Furthermore, the oxidized graphite-incorporated expanded graphite material is easy to mold as compared with the oxidized graphite material only. For example, when an organic high molecular weight material such as an epoxy or phenol resin is used as a binder for the expanded graphite material, it must be heated to at least 500° C, usually at least 1000° C for complete carbonization thereof; on the other hand, the oxidized graphite material as a binder for the expanded one may easily be carbonized without evolution of gases therefrom and expansion thereof by heating to as low as about 210° C. In this manner the oxidized graphite material as compared with other binders will easily be able to be converted to carbon only without expansion during carbonization even by the heat treatment thereof at a lower temperature. The addition of the oxidized graphite material as the binder to the expanded one will permit the binder-added expanded one to have a higher bulk density and higher moldability with a press than the expanded one only even if a desired molding to be obtained is a very thick one. If only the expanded graphite material is attempted to be molded to obtain a molding having a thickness of at least 2mm then the resulting molding, or the resulting moldings when laminated, will tend to cause cracking and peeling in the direction of compression, while if the expanded graphite material incorporated with the oxidized one is attempted to be molded for obtaining a molding having a thickness of as large as at least 10mm then the resulting molding, or the resulting moldings when laminated, will not cause troubles such as cracking and peeling in the direction of compression. In addition, the expanded graphite material molding containing the oxidized graphite material as the binder will not exhibit any change in appearances such as shape and dimension even if it is rapidly heated.

The expanded graphite material and oxidized graphite material may be obtained by treating natural graphite, pyrolytic graphite or Kish graphite with, nitric acid, chromic acid, sodium nitrate, potassium permanganate or a mixture of sulphuric and nitric acids as well as bromine, a halogenide (such as $AlCl_3$, $FeCl_3$, $CuCl_2$, $BCl_3$, $AlBr_3$ or $ZrCl_4$) or the like, thereby forming interlayer compounds in the starting graphite. Generally speaking, materials having a structure wherein the crystal lattice is not dense but has many voids, tend to absorb various other molecules in the voids. Graphites have a particular multi-layer structure of carbon; the bond between carbon molecules in the layer planes of carbon is very strong thereby forming dense layer planes, while the one in the directions perpendicular to the layer planes is weak thereby leaving relatively large spaces between the layers. For this reason, graphites allow foreign reaction products to enter the gap between the layers to combine with the layer planes of carbon thereby forming interlayer compounds without losing or impairing the multilayer structure of carbon. Graphite particles in which the interlayer compounds are formed may be enlarged in gap in the direction perpendicular to the carbon layers, by thermally treating said graphite particles at a high temperature (such as 1200° C) whereby the interlayer compounds are allowed to evolve gases therefrom thus forming gas pressures. Assuming that said direction perpendicular to the carbon layers is hereinafter referred to as "c direction", the expanded graphite material used herein should have c direction expansions preferably 5 – 400 times, more preferably at least 20 times that of the original c direction dimension; that is, the expanded graphite material may be obtained by enlarging the starting graphite material in interlayer distance.

The oxidized graphite material is also called graphitic acid, and the structure thereof is such that oxygen and the like are securely bonded, by coordination bond, to the layer planes of carbon condensed rings; the carbon planes are bent ones without losing aromatic plane character. The interfacial distance varies with moisture contents and it is about 6 A under the driest condition. It is difficult to produce oxidized graphite material with a predetermined composition since the material widely varies with changes in operational conditions under which it is produced. When oxygen is bonded to the carbon atoms in graphite, the atomic ratio of C/O in oxidized graphite material is in the range of from about 2.4 to about 3.5; the oxidized graphite material further contains some amount of hydrogen as a component. These oxygen and hydrogen are considered to be bonded to the carbon atoms as chemical groups such as =O, —OH and —COOH. The oxidized graphite material when contacted with water will allow the water molecules enter between its layers whereby it is made swollen, gel-like and colloidal enough to pass through filters. A process for the production of graphitic acid is illustrated below.

Eighty grams of natural graphite particles (200 mesh or finer), 1860 ml of conc. sulphuric acid and 720 ml of nitric acid were blended together to form a mixture which was maintained below 0° C and incorporated with potassium chlorate in an amount of 15g every 1 hour totalling 880g. The whole mass was then stirred for 18 hours and washed with water several times thereby to obtain a colloidal oxidized graphite material. An aqueous solution of the oxidized graphite material so obtained was added to, and impregnated in, the expanded graphite particles having c direction expansions 200 – 300 times that of the original c direction dimension. The oxidized graphite material may preferably be used in amounts of 1 – 60% by weight of the expanded graphite material used. The use of less than 1 wt.% of the oxidized graphite material will not be so effective in improving the expanded graphite material, while the use of more than 60 wt.% thereof is not desirable since it will degrade the expanded graphite material in gasket coefficient and the like. The oxidized graphite material may more preferably be used in amounts of 5 –40% by weight.

A mixture of the expanded graphite material and the oxidized one may be dried and compression molded at a compression pressure of preferably 80 – 250 kg/cm² to obtain a desired composite material.

The preferable composite graphite material consisting essentially of the expanded graphite material and the oxidized graphite material, obtained by the practice of this invention, has a bulk density of 1.6 – 2.2 g/cc, gasket coefficient of 1.7 – 1.9 and tensile strength of 160 – 250 kg/cm².

EXAMPLE 1

The expanded graphite material was produced as follows.

One hundred grams of natural graphite (70 – 90% of the graphite being in the range of from −24 to +48 mesh in particle size) were mixed with 500 ml of conc. sulphuric acid (97 wt.%) and 50g of sodium nitrate for reaction with each other. The reaction continued for about 16 hours. The acid-treated natural graphite was washed with enough water to obtain treated graphite particles which were then dried at 100° C to remove the remaining water by evaporation. The particles so dried were heat treated at 1300° C for 5 seconds thereby obtaining expanded graphite particles having c direction expansions about 200 times that of the original c direction dimension.

The oxidized graphite material was produced as follows.

Eighty grams of natural graphite particles (95% thereof being 300 mesh or finer in particle size), 1860 ml of conc. $H_2SO_4$ (97 wt.%) and 40g of sodium nitrate were mixed together to form a mixture which was then kept below 0° C by using Dry Ice (Trade mark) or solidified carbon oxide and incorporated with potassium permanganate in an amount of 30g totalling 240g. The whole mass was stirred for additional 18 hours while raising it in temperature slowly to room temperature, after which the whole mass was diluted with water while removing the heat evolved by using ice. The whole mass so diluted was incorporated with an about 10% aqueous solution of hydrogen peroxide in such an amount that the $KMnO_4$ in the mass changed in color from violet-red to colorless, in order to reduce the permanganate to the corresponding manganate. The whole mass so treated was washed several times with water to an extent that it became a neutral one, thereby obtaining the oxidized graphite material. One gram of the oxidized graphite material so obtained was incorporated with 20g of water to obtain an aqueous dispersion thereof. The dispersion of the oxidized graphite material thus obtained was mixed with 9g of the expanded graphite material to form a mixture which was then dried at 130° C followed by being compression molded at a compression pressure of 100 kg/cm².

COMPARATIVE EXAMPLE 1

The expanded graphite material as obtained in Example 1 was compression molded without the use of a binder at a compression pressure of 200 kg/cm² to obtain an 0.5 mm thick expanded graphite sheet material.

COMPARATIVE EXAMPLE 2

The expanded graphite material as obtained in Example 1 was impregnated with a phenol resin. The resulting mixture was compression molded at a compression pressure of 100 kg/cm² and then heat treated at 150° C to obtain an 0.5 mm thick, phenol resin-expanded graphite composite sheet material in which the phenol resin component was contained in an amount of 20% by weight. The composite sheet material so obtained was not fully flexible and caused cracks when bent.

The sheets mentioned above had the following properties.

Table 1

| Item | Example 1 | Comparative example 1 | Comparative example 2 |
|---|---|---|---|
| Thickness of sheet (mm) | 0.5 | 0.5 | 0.5 |
| Bulk density | 1.6 | 1.6 | 1.6 |
| Gasket coefficient | 1.8 | 2.0 | 2.5 |
| Tensile strength (kg/cm²) | 160 | 120 | 140 |

EXAMPLES 2-6

The procedure of Example 1 was repeated, but using the oxidized graphite material and the expanded one in the respective amounts as indicated in Table 2. The properties of the moldings obtained are shown in Table 2.

Table 2

| Item | Example 2 | Example 3 | Example 4 | Example 5 | Example 6 |
|---|---|---|---|---|---|
| Content of oxidized graphite material(%) | 5 | 10 | 20 | 30 | 40 |
| Bulk density | 1.6 | 1.70 | 1.70 | 1.65 | 1.6 |
| Gasket coefficient | 1.8 | 1.7 | 1.7 | 1.8 | 2.0 |
| Tensile strength (kg/cm$^2$) | 160 | 170 | 200 | 180 | 160 |

EXAMPLE 7

The oxidized graphite material-expanded graphite material composite molding obtained by following the procedure of Example 1 was heated at a temperature-raising rate of 25° C/hr to 400° C in a nitrogen atmosphere for baking. After the baking, the molding so baked exhibited no change in appearance. In addition, the comparison of the original composite molding with the oxidized graphite-free expanded graphite material as obtained in Comparative example 1 is indicated in the following Table 3.

Table 3

| Item | Example 7 | Comparative example 1 |
|---|---|---|
| Bulk density | 1.6 | 1.6 |
| Gasket coefficient | 1.8 | 2.0 |
| Tensile strength (kg/cm$^2$) | 160 | 120 |

What is claimed is:

1. A process for producing a composite graphite material in a molded form having high density, high tensile strength and impermeability, characterized by incorporating expanded graphite material with oxidized graphite material in amounts of 1 – 60% by weight of expanded graphite material to form a mixture and then compression molding the resulting mixture.

2. A process according to claim 1, wherein the compression molding is effected at a compression pressure of 80 – 250 kg/cm$^2$.

3. A process according to claim 1, wherein the expanded graphite material has $c$ direction expansions 5 – 400 times that of the original $c$ direction dimension and the oxidized graphite material contains carbon and oxygen in atomic ratios of from 2.4 to 3.5.

4. A process according to claim 1, wherein the mixture is dried prior to being compression molded.

5. A composite graphite material in a molded form having a bulk density of 1.6 – 2.2 g/cc, gasket coefficient of 1.7 – 1.9 and tensile strength of 160 – 250 kg/cm$^2$, the composite graphite material consisting essentially of expanded graphite material having $c$ direction expansions 5 – 400 times that of the original $c$ direction dimension and 1 – 60% by weight, based on the expanded graphite material, of oxidized graphite material containing carbon and oxygen in atomic ratios of from 2.4 to 3.5.

* * * * *